June 24, 1947. W. F. O'NEIL 2,422,744
AUXILIARY JET POWER MEANS FOR AIRCRAFT
Filed Sept. 30, 1944 4 Sheets-Sheet 1
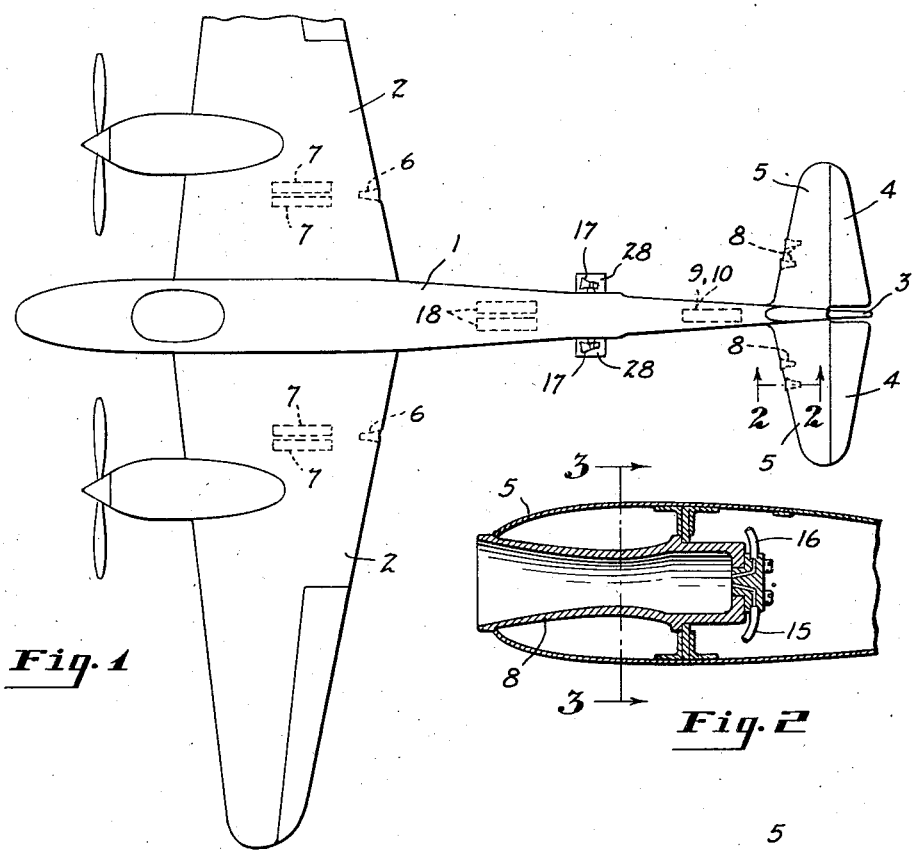
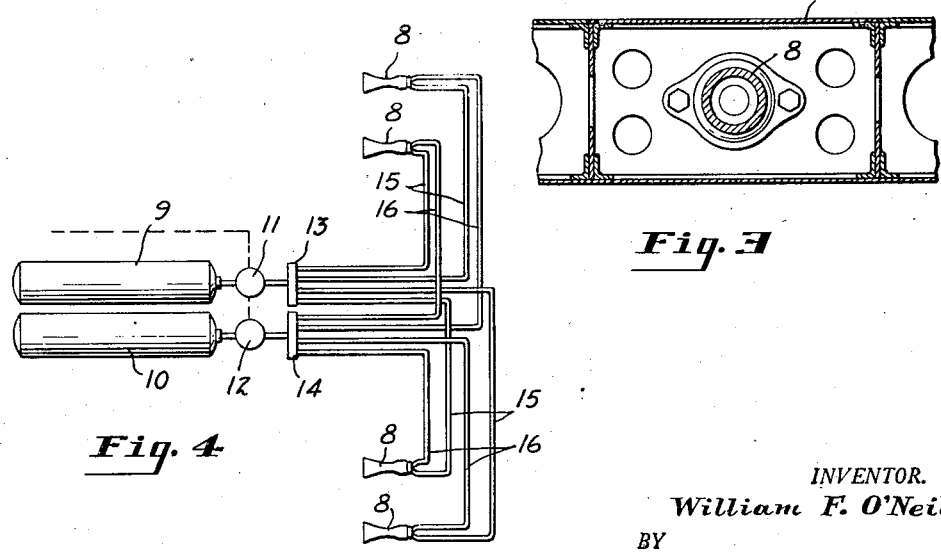
INVENTOR.
William F. O'Neil
BY
Evans + McCoy
ATTORNEYS

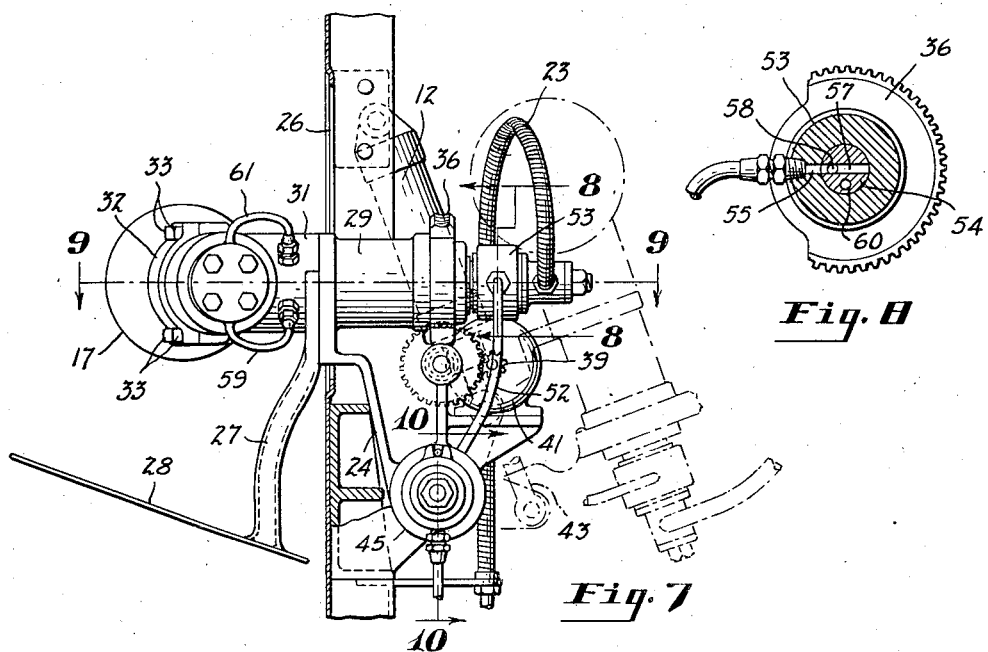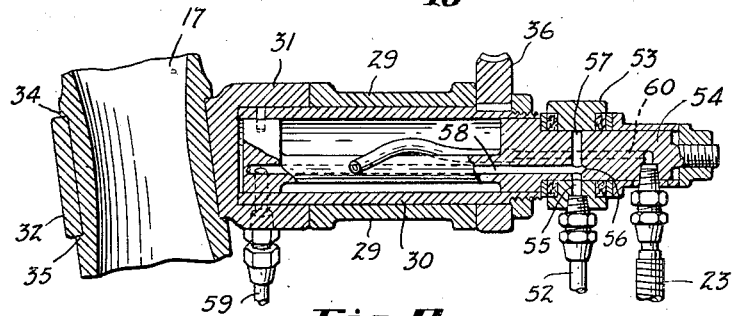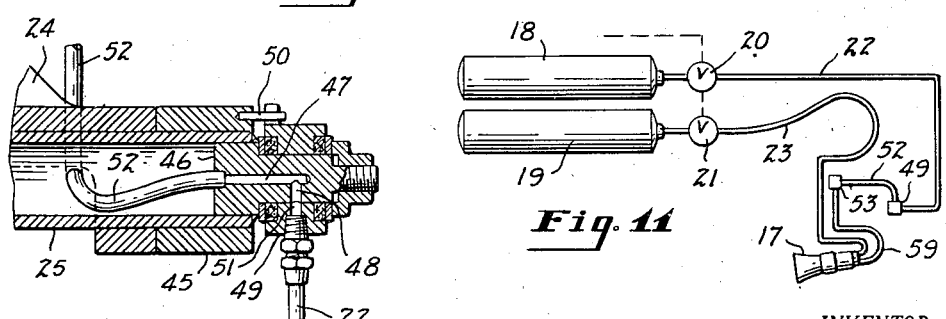

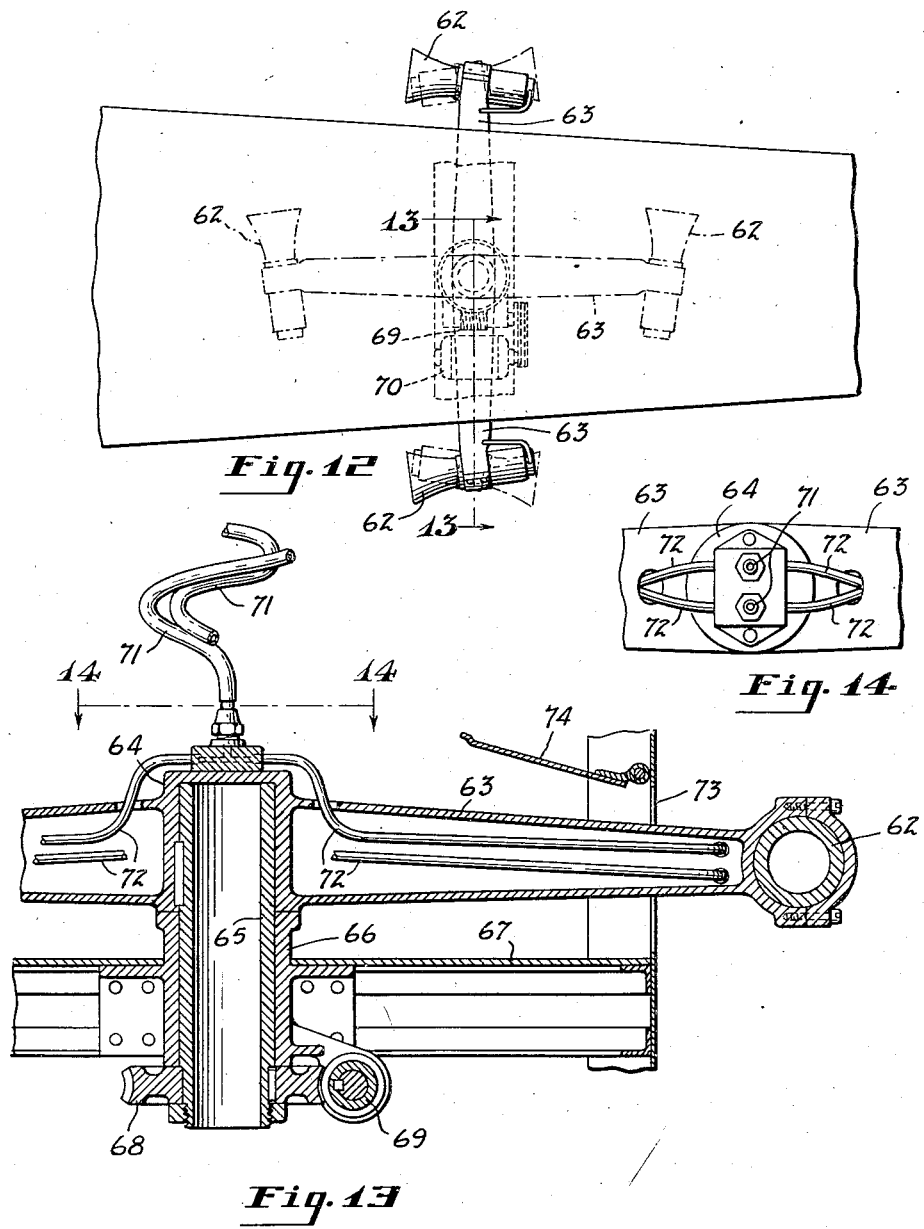

Patented June 24, 1947

2,422,744

UNITED STATES PATENT OFFICE 2,422,744

AUXILIARY JET POWER MEANS FOR AIRCRAFT

William F. O'Neil, Akron, Ohio, assignor to The General Tire & Rubber Company, Akron, Ohio, a corporation of Ohio Application September 30, 1944, Serial No. 556,558

3 Claims. (Cl. 244—74)

This invention relates to auxiliary propulsion devices for airplanes and its main objects are to provide an improved system of propulsion jets by which the speed of travel of a plane may be momentarily accelerated during take-offs, and to provide jets so mounted and so arranged that they may be utilized for quickly reducing speed to facilitate the landing, braking or retarding action of the plane.

A further object of the invention is to provide a mounting for a propulsion jet nozzle by means of which the nozzle may be retracted into the body of the plane when not in use and extended to an operative position outside the body of the plane.

A further object is to provide nozzles that are adjustable from a forwardly directed position to a rearwardly directed position so that they may be used either for retarding or accelerating the speed of travel.

An additional object of the invention is to provide jet controlling means for preventing operation of the jet when it is in any position other than the extended operative position.

With the above and other objects in view, the invention may be said to comprise the device as illustrated in the accompanying drawings, hereinafter described and particularly set forth in appended claims, together with such variations and modifications thereof as will be apparent to one skilled in the art to which the invention pertains.

Reference should be had to the accompanying drawings forming a part of this specification, in which Fig. 1 is a top plan view of an airplane to which the invention is to be applied;

Fig. 2 is a section taken on the line indicated at 2—2 in Fig. 1;

Fig. 3 is a section taken on the line indicated at 3—3 in Fig. 2;

Fig. 4 is a diagrammatic view showing the tanks for the jet creating fluids and the connections from the tanks to the forwardly directed jets on the tail planes;

Fig. 7 is a vertical section taken on the line indicated at 7—7 in Fig. 6;

Fig. 8 is a vertical section taken on the line indicated at 8—8 in Fig. 7;

Fig. 9 is a horizontal section taken on the line indicated at 9—9 in Fig. 7;

Fig. 10 is a vertical section taken on the line indicated at 10—10 in Fig. 7;

Fig. 11 is a diagrammatic view of the fluid pressure tanks and connections from the tanks to the fuselage nozzles;

Fig. 12 is a fragmentary top plan view showing a modified form of adjustable mounting for the fuselage nozzles;

Fig. 13 is a section taken on the line indicated at 13—13 in Fig. 12, and

Fig. 14 is a section taken on the line indicated at 14—14 in Fig. 13.

Figure 5:
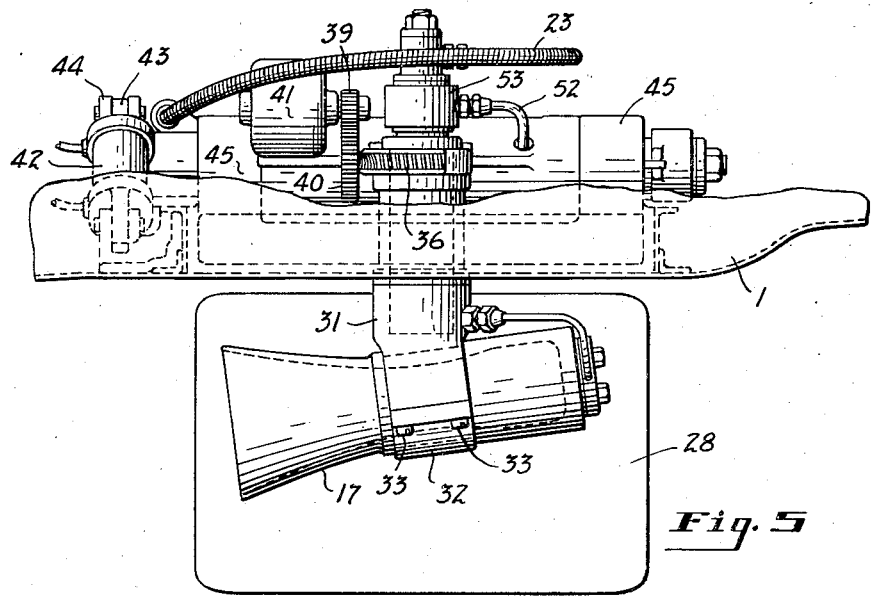
Fig. 5 is a fragmentary plan view on an enlarged scale of one of the jet nozzles mounted upon a fuselage.

In the accompanying drawings the invention is shown applied to an airplane which has a fuselage 1, wings 2, a rudder 3 at the rear end of the fuselage, elevators 4 on opposite sides of the rudder, and tail planes 5 rigid with the fuselage forwardly of the elevators. The wings 2 are shown provided with rearwardly directed propulsion nozzles 6 that are mounted in the trailing edges of the wings. Jet creating fluids may be delivered to the nozzles 6 from cylinders 7 through suitable connections (not shown). The jet may be created in each nozzle by means of two fluids, one of which is a combustible composition delivered from one of the tanks and the other of which is an oxidizing composition delivered from the other tank, the two fluids uniting when delivered into the nozzle to cause combustion and extremely rapid expansion of gases, which creates a propulsion jet. The igniting fluid is preferably one which carries sufficient oxygen to support combustion of the fluid fuel. For example, the igniting fluid may be fuming nitric acid and the fluid fuel may be aniline. Where compositions are employed which do not spontaneously ignite when mixed, suitable devices may be provided for igniting the mixture.

Propulsion jets produced by rockets or by means of nozzles similar to the nozzles 6 have been provided for assisting in the take-off of airplanes. The present invention, however, contemplates the use of such jets for retarding the forward speed of an airplane, as well as for increasing the acceleration during take-offs.

As shown in Fig. 1, a plurality of forwardly directed nozzles 8 are mounted in the leading edges of the tail planes 5 and these nozzles are connected to fluid pressure cylinders 9 and 10 which supply the jet creating fluids. As shown in Fig. 4, cylinders 9 and 10 are connected through valves 11 and 12 with headers 13 and 14, and each of the nozzles 8 is provided with pipes 15 and 16 which lead to the headers 13 and 14, respectively. Any suitable and convenient means may be employed for operating the valves 11 and 12 to create propulsion jets in the nozzles 8 when desired. The action of the jets created in the nozzles 8 offers a strong resistance to forward movement which is effective to quickly reduce the forward speed. Such retardation of forward speed is highly desirable to enable an airplane to land on a short runway.

In addition to the rearwardly directed nozzles 6 and the forwardly directed nozzles 8, additional jet nozzles 17 are mounted upon the fuselage 1 in the space between the wings 2 and the tail planes 5. Each nozzle 17 is supplied with jet creating fluids from a pair of pressure cylinders 18 and 19. Delivery of fluid from the cylinders 18 and 19 is controlled by valves 20 and 21, these valves controlling the flow to the pipes 22 and 23 through which the fluid from the cylinders 18 and 19 is delivered to the nozzles 17.

Figure 6:
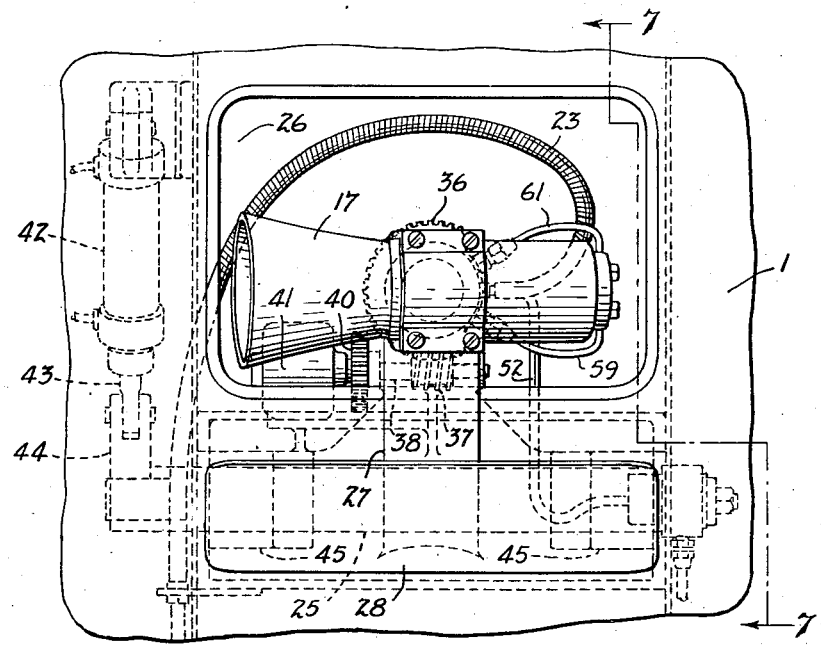
Fig. 6 is a side elevation of the jet nozzle shown in Fig. 5.

As shown in Fig. 1, two nozzles 17 are provided, one on each side of the fuselage. The two nozzles 17 are identical and each may be supplied from an independent pair of fluid pressure cylinders. Figs. 5 to 10 show the mounting of one of the nozzles 17, it being understood that the other nozzle is mounted in identical manner on the opposite side of the fuselage. Each nozzle 17 is supported on a carrier arm 24 that is mounted to turn about the axis of a pivot shaft 25 which extends longitudinally of the fuselage. The shaft 25 is mounted inside the fuselage and each side wall of the fuselage is provided with an opening 26 through which the nozzle 17 may be moved from a retracted position within the fuselage, to its operative position outside the fuselage by a pivotal movement of the arm 24.

An arm 27 attached to the arm 24 carries a closure plate 28 which is adapted to close the opening 26 when the nozzle is swung to its retracted position shown in dotted lines in Fig. 7.

The arm 24 has a bearing portion 29 at its outer end on which a tubular nozzle supporting member 30 is rotatably mounted. The axis of the tubular member 30 is disposed transversely with respect to the axis of the shaft 25, and the member 30 is rotatable to position the nozzle 17 to direct a jet forwardly or rearwardly as may be desired. The member 30 has a nozzle supporting cap 31 at its outer end to which the nozzle 17 is secured by means of a clamping plate 32 secured to the cap 31 by means of screws 33. The nozzle 17 is provided with shoulders 34 and 35 which engage opposite sides of the clamping portion of the cap 31 so that the nozzle is firmly held against endwise movements.

A worm gear 36 is fixed in the inner end of the tubular member 30 and meshes with a worm 37 fixed to a shaft 38 that is driven through reduction gears 39 and 40 by an electric motor 41. By operating the motor 41 the position of the nozzle 17 may be reversed when desired.

For shifting the nozzle into or out of the fuselage, a fluid pressure cylinder 42 is pivoted at its upper end to the fuselage and has a piston rod 43 that is pivoted to an arm 44 attached to the shaft 25. The usual means may be provided for controlling the delivery of fluid under pressure to the cylinder 42 so that the nozzle may be moved from the position shown in full lines in Fig. 7 to the position shown in dotted lines, or vice versa, and held in either adjusted position.

As shown in Fig. 10, the shaft 25 has a tubular body portion and is rotatably mounted in fixed bearing members 45. A plug 46 closes one end of the shaft 25 and extends beyond the tubular portion. The plug 46 is provided with an axial passage 47 leading from its inner end and extending to a radial passage 48 beyond the end of the tubular portion of the shaft. A collar 49 is mounted upon the plug 46 and is held against turning movements by means of a pin 50 which connects the same to the adjacent fixed bearing member 45. The collar 49 has a radial passage 51 that is adapted to register with the radial passage 48 in the plug 46 when the arm 24 is in upright position, and the pipe 22 is attached to the collar 49 and communicates with the radial passage 51. A pipe 52 is attached to the inner end of the passage 47 and extends through the wall of the tubular shaft 25 to a collar 53 that is mounted on the tubular member 30. The tubular member 30 has a core member 54 attached thereto which provides a bearing for the collar 53. The collar 53 has a radial pasage 55 that communicates with the pipe 52 and which is adapted to register with one or the other of two transverse passages 56 and 57 in the core member 54. The passages 56 and 57 are angularly spaced and communicate with an axial passage 58 which communicates through the cap 31 with a pipe 59 leading from the cap to the nozzle 17.

The plug 46 and collar 49 form a valve controlling the flow of fluid to the nozzle, the radial passage 48 of the plug 46 attached to the shaft 25 being so positioned that communication is established with the supply pipe 22 only when the carrier arm 24 is positioned to support the nozzle 17 outside the fuselage, as shown in full lines in Fig. 7. The core member 54 and collar 53 form a second valve in which the passages 55 and 57 of the core member 54 are so positioned that fluid is delivered to the nozzle 17 through the pipe 52 only when the nozzle 17 is directed forwardly or rearwardly, the two passages 56 and 57 being spaced 180°.

The core 54 is provided with a second axial passage 60 that extends to the cap 31 and communicates with the supply pipe 23, which is in the form of a flexible hose and positioned to permit the turning of the tubular member 30 through an angle of 180° to adjust the nozzle 17. The passage 60 is connected to the nozzle 17 through a short pipe 61 extending from the cap 31 to the nozzle 17. The nozzles 17 may be used in conjunction with the nozzles 6 to increase acceleration during take-offs, or they may be used alone or in conjunction with the nozzles 8 on the tail planes 5 to retard the speed of the plane when landing.

In Figs. 12 to 14 of the drawings, a modified mounting of fuselage nozzles is disclosed in which nozzles 62 are attached to the ends of arms 63 that are formed integral with a central cap 64 that is fixed to the upper end of a rotatable post 65 that is mounted in a bearing member 66, mounted centrally of the fuselage on a cross beam 67. The two arms 63 are preferably diametrically alined and of equal length so that when the supporting post 65 is rotated the nozzles may be swung from the retracted inoperative position shown in dotted lines in Fig. 12, either to a forwardly directed operative position as shown in full lines in Fig. 12, or to a rearwardly directed operative position such as shown in dotted lines in Fig. 12.

For imparting turning movements to the post 65, a worm gear 68 is attached to the lower end of the post and meshes with a worm 69 that is adapted to be driven by a motor 70.

Jet creating fluids may be delivered to the nozzles 62 through flexible pipes 71 connected to the cap 64 and through pipes 72 connected to the cap 64 and extending through the hollow arm 63 to the nozzles 62. The fuselage is provided with openings 73 on opposite sides thereof through which the arms 63 and nozzles 62 may be moved, and these openings may be closed by suitable doors 74 when the nozzles and end supporting arms are positioned in the fuselage as shown in dotted lines in Fig. 12.

It is to be understood that variations and modifications of the specific device herein shown and described for purposes of illustration, may be made without departing from the spirit of the invention.

What I claim is:

1. In an airplane having wings and a fuselage, a jet nozzle mounted on the fuselage for movement from a retracted position within the fuselage to an operative position outside the fuselage, means for supplying fuel to said nozzle, and means for automatically rendering said fluid supplying means inoperative when the nozzle is moved to retracted position.

2. An airplane having a chamber, a jet nozzle mounted on said airplane for movement from a retracted position within said chamber to an operative position outside said chamber, means for creating a propulsion jet in said nozzle and means for automatically rendering said jet creating means inoperative when said nozzle is moved to retracted position.

3. In an airplane, an arm mounted for movement about an axis transverse to the arm, a jet creating combustion nozzle mounted on the arm for angular adjustment about an axis transverse to the arm and to said first mentioned axis, a tank containing fluid under pressure, and means for conducting fluid from said tank to said nozzle, including valves controlled by pivotal movements of said arm and of said nozzle.

WILLIAM F. O'NEIL.

REFERENCES CITED

The following references are of record in the file of this patent:

UNITED STATES PATENTS

| Number | Name | Date |
|---|---|---|
| 2,076,398 | Garden | Apr. 6, 1937 |
| 1,809,220 | Schuette | June 9, 1931 |
| 1,629,767 | Valdes | May 24, 1927 |
| 1,611,353 | Lepinte | Dec. 21, 1926 |
| 2,081,151 | Myers | May 25, 1937 |
| 1,681,562 | Wenstrom | Aug. 21, 1928 |
| 1,834,149 | Goddard | Dec. 1, 1931 |
| 1,904,134 | Hall-Brown | Apr. 18, 1933 |
| 2,086,545 | Fator | July 13, 1937 |

FOREIGN PATENTS

| Number | Country | Date |
|---|---|---|
| 157,231 | Switzerland | Dec. 1, 1932 |